Nov. 13, 1956  S. A. MENCACCI  2,770,274
BEAN SNIPPER
Filed Dec. 23, 1952  5 Sheets-Sheet 4
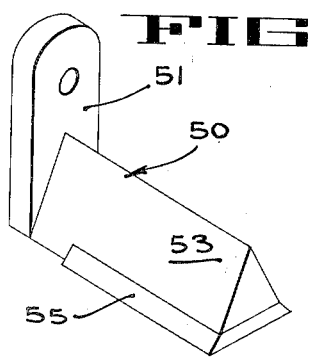
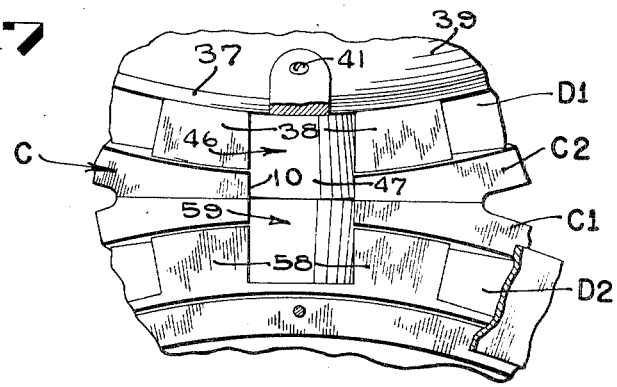
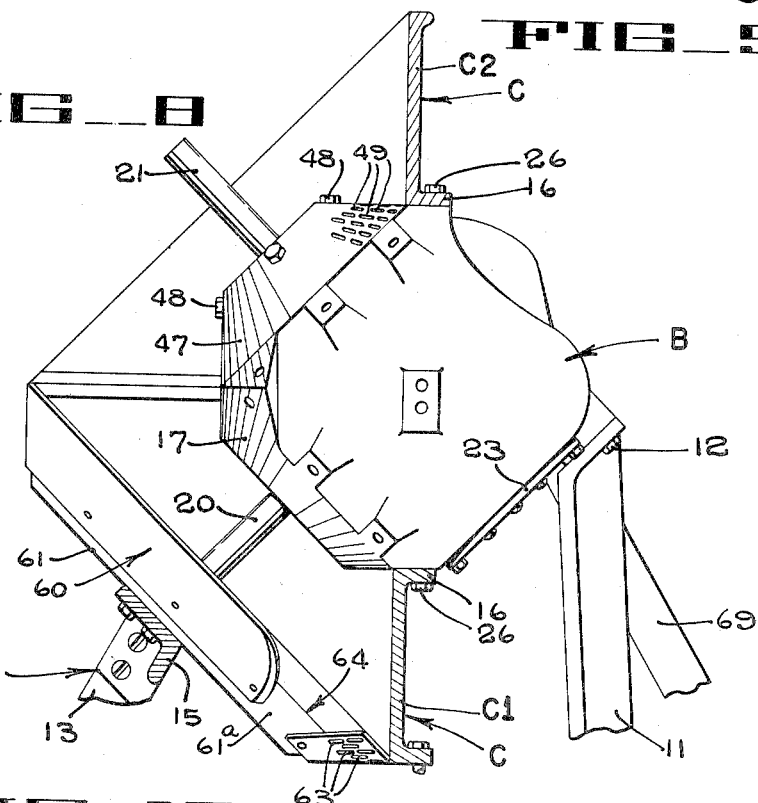
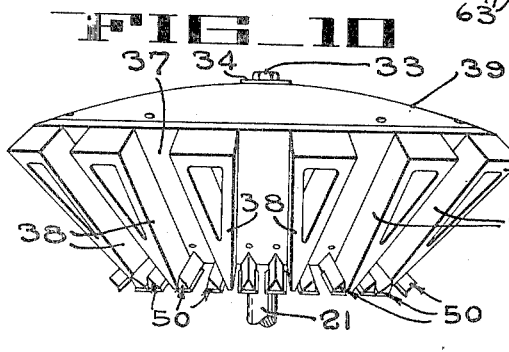
INVENTOR
SAMUEL A. MENCACCI
BY Hans G. Hoffmeister
ATTORNEY

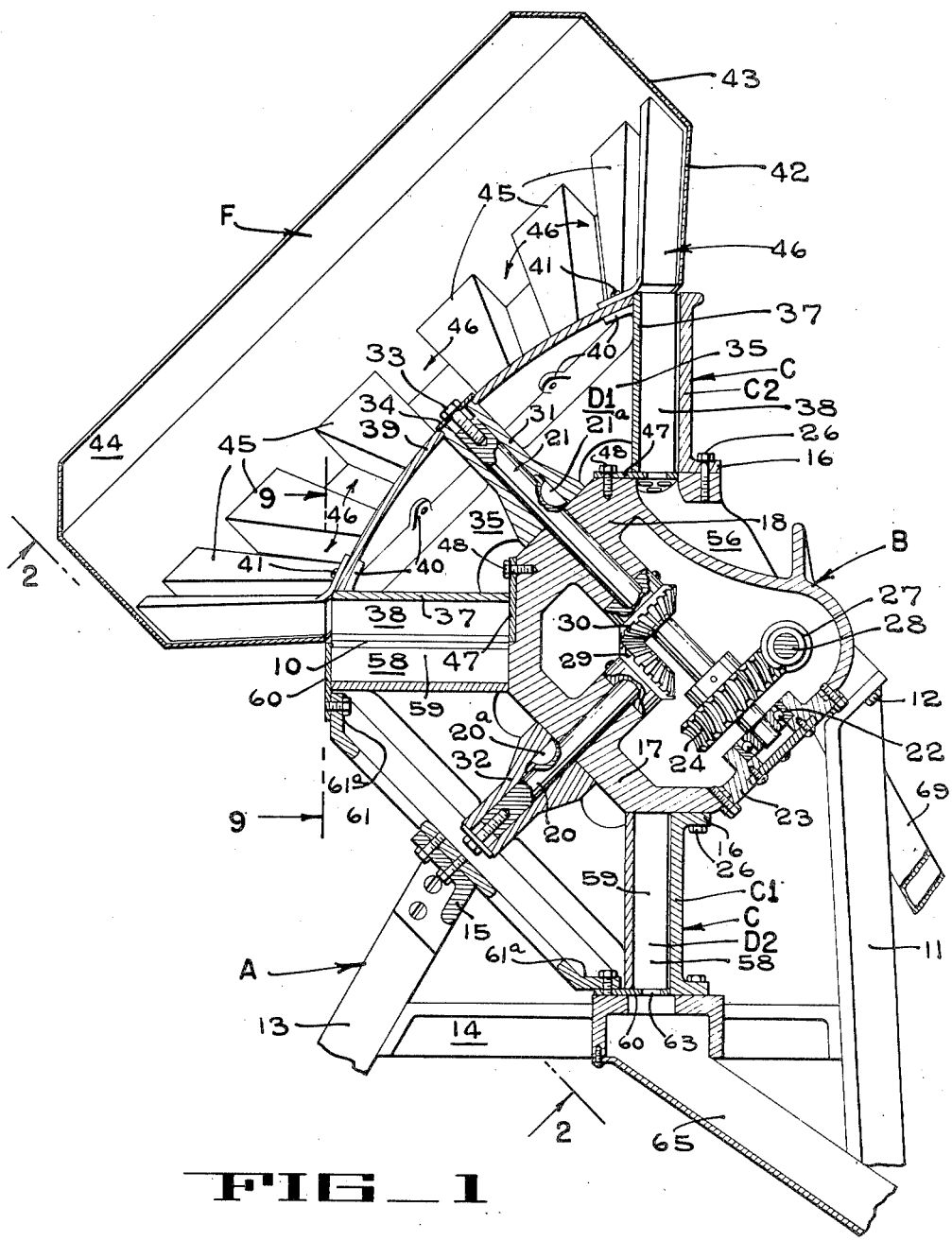

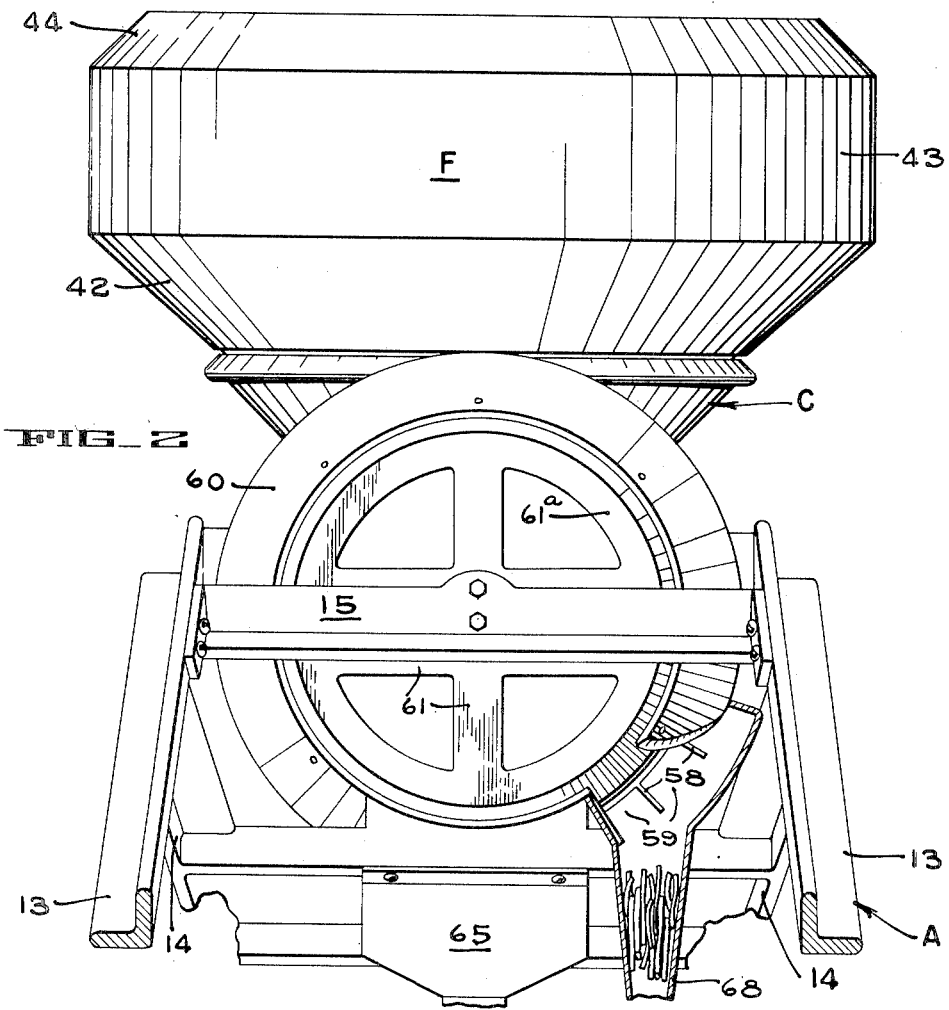
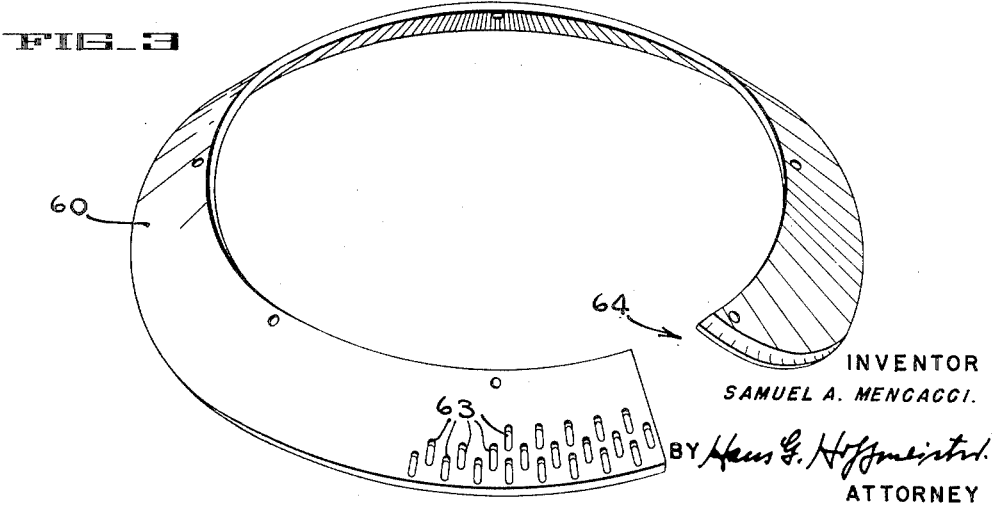

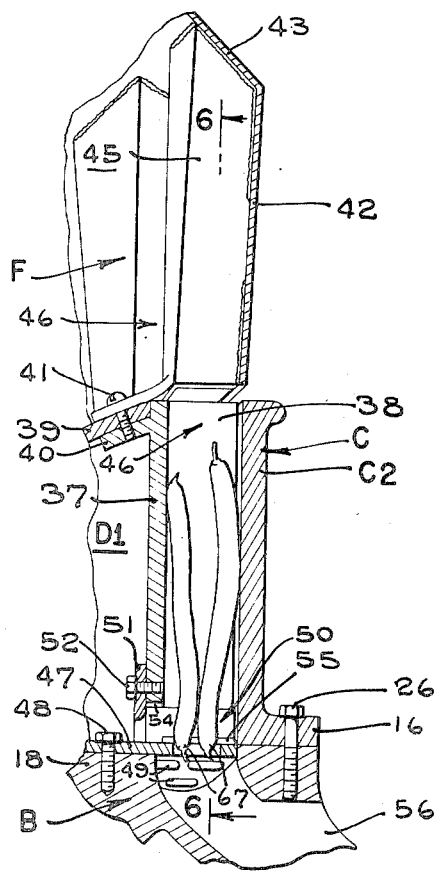
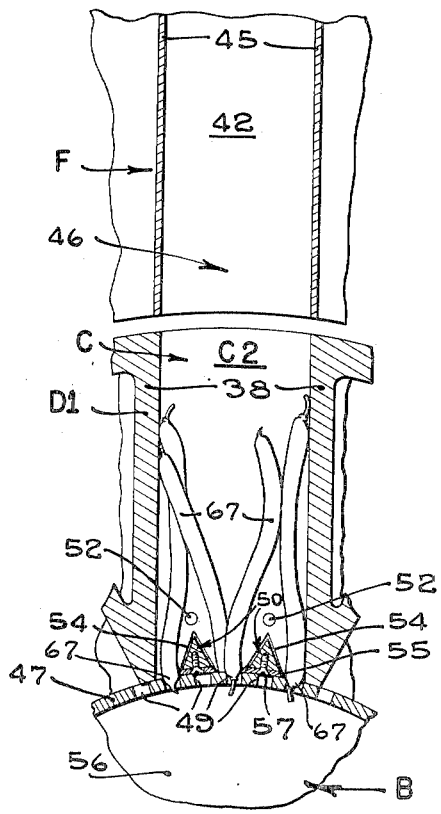
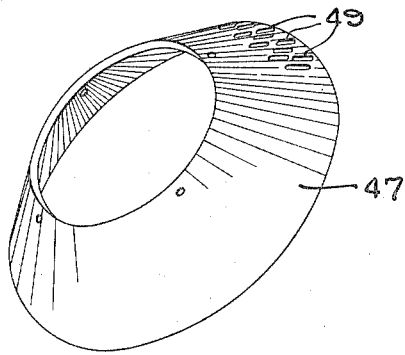

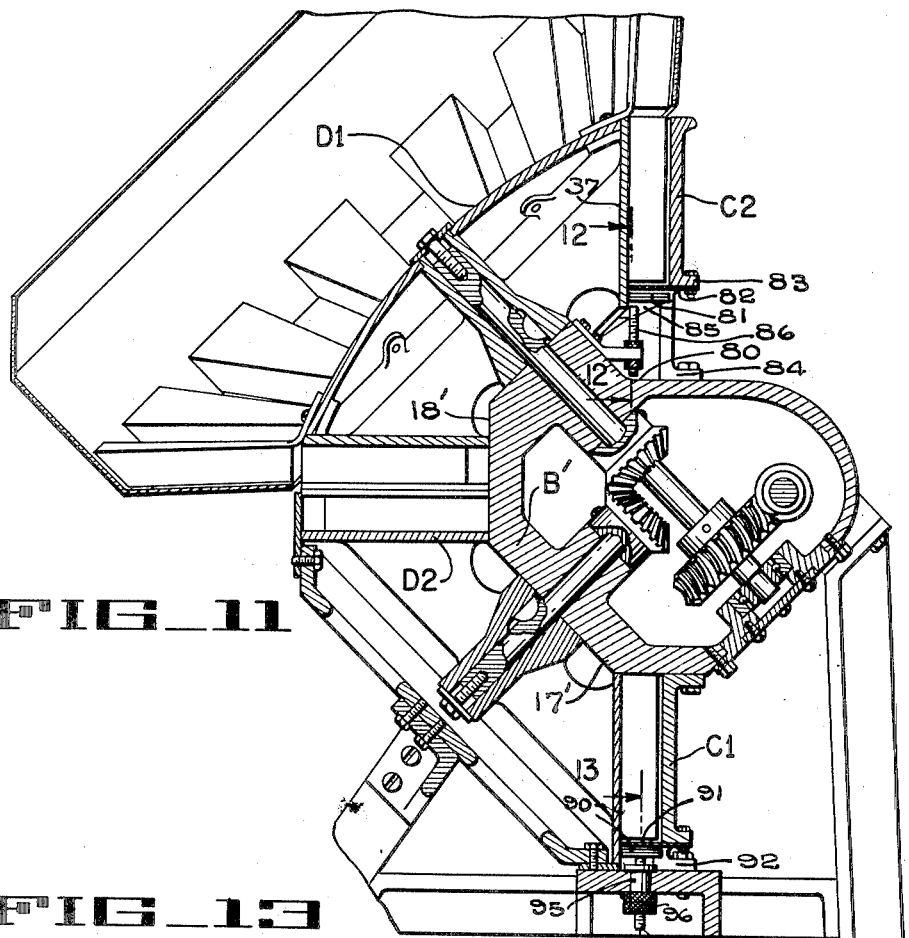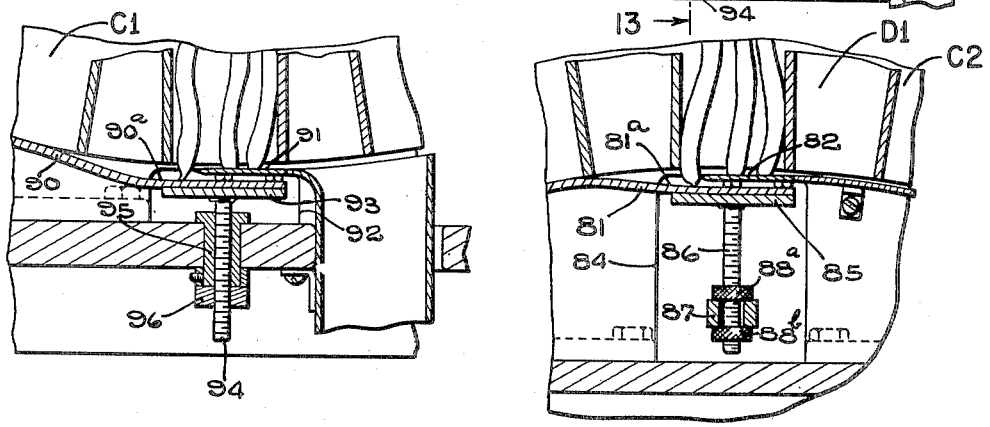

United States Patent Office 2,770,274
Patented Nov. 13, 1956

2,770,274
BEAN SNIPPER

Samuel A. Mencacci, San Jose, Calif., assignor to Food Machinery and Chemical Corporation, San Jose, Calif., a corporation of Delaware Application December 23, 1952, Serial No. 327,515

11 Claims. (Cl. 146—86)

The present invention relates to bean snipping mechanism, and more particularly to a machine for aligning beans in individual batches, snipping the tips from one end of the beans in each batch, positively reversing the batches of beans end for end, and snipping the tips from the other end of the beans therein.

An object of the present invention is to provide an improved bean snipping mechanism.

Another object is to provide a machine for positively positioning beans and snipping the ends therefrom.

Another object is to provide a machine for arranging a promiscuous mass of beans into separate, individual, aligned batches, inserting each batch into an upright pocket so that the beans fall by gravity with their tips projecting downwardly into a snipping device, and then snipping the tips from the beans thus arranged.

Another object is to provide a fully automatic machine adapted to positively arrange a batch of beans in aligned relation, snip off the tips from one end thereof, positively reverse the beans end for end, and then snip off the tips from the other ends of the beans thus reversed.

Another object is to provide in a bean snipping machine, a pair of bean carriers with batch receiving pockets, means for effecting insertion of batches of beans in substantially parallel order into the pockets of one of said carriers, means for snipping the tips from one end of the beans in each of said pockets, and means effective after snipping to transfer the beans to a pocket in the other of said carriers, for snipping the tips from the other end of the beans of each batch.

Another object is to provide a compact bean snipping mechanism capable of quickly and effectively processing large volumes of beans or other elongated products.

These and other objects of the invention will be brought out more fully in the following description and the accompanying drawings, wherein:

Fig. 1 is a vertical longitudinal section of the upper portion of a bean snipping machine embodying the present invention.

Fig. 2 is a section taken along the line 2—2 of Fig. 1, portions of a bean discharging chute being broken away.

Fig. 3 is an enlarged perspective view of a shear plate employed in the bean snipping machine.

Fig. 4 is a perspective view of another shear plate employed in said machine.

Fig. 5 is an enlarged fragmentary sectional view similar to the upper portion of Fig. 1.

Fig. 6 is a section taken along the line 6—6 of Fig. 5.

Fig. 7 is an enlarged perspective view of a snipping blade unit of the type illustrated in Figs. 5 and 6.

Fig. 8 is a fragmentary side elevation of the gear case shown sectionally in Fig. 1.

Fig. 9 is an enlarged fragmentary section taken along the line 9—9 of Fig. 1.

Fig. 10 is a side elevation of a component of the bean snipping machine, that is shown only partly in Figs. 5 and 6.

Fig. 11 is a fragmentary section similar to Fig. 1 illustrating a modified embodiment of the present invention.

Figs. 12 and 13 are vertical sections taken along lines 12—12 and 13—13 respectively of Fig. 11.

The illustrated form of the invention comprises in general a base frame A upon which is securely mounted a gear case B having a wall C bolted thereto which has substantially the form of two truncated cones C1 and C2 disposed at right angles to, and tangentially intersecting each other, with a communicating gap 10 provided between the upper and lower, conical wall portions C1 and C2 substantially along their plane of tangency. An upper rotary carrier D1 of truncated conical shape is mounted co-axially within the upper conical wall portion C2, while in the lower wall portion C1, a second, generally similar, conical bean carrier D2 is similarly mounted. The two rotary carriers D1 and D2 are in a substantially tangential relation through the opening 10 which interconnects the upper and lower conical wall portions C1 and C2. A bean arranging hopper F is secured to the upper carrier D1 to extend co-axially outwardly from the outer end thereof and rotate therewith.

The frame A comprises a pair of vertical rear legs 11 of angle iron, to the upper ends of which the gear case B is secured by bolts 12. A pair of inclined front legs 13 are connected to the rear legs 11 by horizontal angle iron braces 14 (Figs. 1 and 2). A transverse frame brace 15 is secured to the upper ends of the front legs.

The gear case B may be of conventional cast metal construction, and has a pair of superposed truncated conical embossments 17 and 18 formed thereon. The axes of these conical embossments diverge from each other along a vertical plane and are disposed at equal angles of approximately 45 degrees above and below the horizontal, respectively. Each of the conical wall portions C1 and C2 has a marginal flange 16 around its smaller end which is adapted to fit onto the marginal rims of a respective conical gear case embossment 17 or 18 to which it is secured by cap screws 26, so that the embossments form the bottoms of the recesses formed by said conical wall portions C1 and C2, respectively (Figs. 1 and 8).

A pair of shafts 20 and 21 are journaled in the embossments 17 and 18, respectively, of the gear case B with their axes coincident with the center axes of said embossments. The upper shaft 21 extends downwardly across the interior of the gear case B, and its lower end is journaled in a ball bearing 22 mounted in a recess formed in an annular closure plate 23 of the gear case. A worm gear 24 is pinned to the upper shaft 21 within the gear case near its lower end (Fig. 1) and is in driven engagement with a worm pinion 27 secured on a drive shaft 28 which is journaled in the gear case and extends exteriorly thereof. The drive shaft 28 is adapted to have usual driven connection with power drive means, such as an electric motor, not shown.

The lower shaft 20 has a bevel gear 29 secured to its inner end. This gear is in meshed driven engagement with a similar bevel gear 30 secured on the upper shaft 21 so that the two shafts 20 and 21 will revolve at the same speed but in opposite directions.

The upper conical carrier member D1 has a central hub portion 31 within the bore of which the upper shaft 21 is received and to which said shaft is secured by a key 21a (Fig. 1). Similarly the lower carrier D2 has a hub portion 32 within the bore of which is received the shaft 20 and to which said shaft is secured by a key 20a. A truncated conical wall portion 37 is secured co-axially to the hub 31 of the upper carrier D1 by a plurality of integrally cast radially extending arches 35. A cap screw 33 is screwed into a threaded hole axially of the outer end of the shaft 21, and by means of a washer 34, retains the hub 31 against outward displacement on the shaft 21. The washer 34 also overlies the marginal area around a central hole in a domed plate 39 which fits over a reduced outer end portion of the hub 31. The outer edge of the domed plate 39 (Figs. 1, 5 and 10) fits closely within the upper end of the conical wall 37 of the carrier. The domed plate 39 rests on ears 40 projecting inwardly from the wall of the carrier, and is secured to the ears by screws 41.

A plurality of integrally cast partitions 38 having the form of downwardly pointing wedges project outwardly (Figs. 1 and 10) from the conical wall 37 of the upper carrier D1 to have a close rotative fit within the upper conical wall portion C1 thus defining a plurality of pockets extending lengthwise of the periphery of the carrier wall 37. The clearance between the carrier pocket partitions 38 and their surrounding wall portion C1 is not sufficient to permit beans to become lodged therebetween during operation of the mechanism.

The bean arranging hopper F may be secured to the outer end of the upper carrier D1 by the same screws 41 which secure the domed cover plate 39 to the upper carrier D1. The hopper F comprises a conical wall portion 42, the inner face of which is substantially co-extensive with the radially directed outer faces of the wedge shaped partitions 38 of the upper carrier D1. A cylindrical wall portion 43 may adjoin the outer edge of the conical wall portion 42 to increase the capacity of the hopper without unduly increasing its diameter. An inwardly extending conical rim 44 may be provided around the outer end of the cylindrical wall portion 43 to retain the beans in the hopper against spillage.

A plurality of downwardly tapering partitions 45 (Fig. 1) are fitted onto the inner side of the conical wall portion 42 of the hopper, with their upper ends suitably brazed or welded to the cylindrical wall portion 43 thereof. Each of the tapered partitions 45 is co-extensive with one of the wedge like partitions 38 on the carrier D1 and all are tapered to such a degree that the pockets 46 formed between the co-extensive hopper partitions 45 and the wedge-shaped carrier partitions 38, are continuous throughout the combined lengths of the conical hopper and carrier walls.

A tip snipping or shear plate 47 in the form of a truncated cone (Figs. 1, 4, 5, 6 and 8) is fitted onto the upper conical embossment 18 on the gear case B to fit closely beneath the lower ends of the pockets 46. The shear plate 47 extends inwardly beyond the upper carrier wall portion 37 and is secured to the upper gear case embossment 18 by cap screws 48. In its uppermost segment said shear plate 47 has a plurality of slotted perforations 49 which are large enough to receive therein the tip ends of beans to be snipped (Figs. 5 and 6), but small enough to retain the beans in supported position. Thus, when the pockets 46 in the upper carrier D1 are upright, and over the perforated area of the shear plate 47, the tips of the beans in the pockets 46 will tend to gravitate into the perforations 49.

In the form of the invention shown in Fig. 1 no separate knives or shear blades are employed, in which case the lower ends of the wedge shaped partitions 38 of the carrier D1 have wiping or shearing engagement with the edges surrounding the perforations 49 in the shear plate 47 to shear off the tips of beans which drop into the perforations. However, in the modified form of tip shearing arrangement shown in Figs. 5, 6, 7 and 10, blade supports 50 are adapted to fit into and extend through notches 54 in the inner edge of the conical carrier wall 37 and are secured in place by ears 51 formed integrally with the blade supports and adapted to fit along the inner side of said wall 37. Cap screws 52, passing through the holes provided therefor in the ears 51, are screwed into threaded holes in the carrier wall to secure the blade supports in position. The blade supports extend radially outwardly across the lower ends of the bean carrying pockets 46, their outwardly extending portions being preferably of triangular cross section as shown at 53 to guide the beans into the narrow spaces between their base edges and thence into the perforations 49 in the shear plate 47.

A tip snipping blade 55, preferably of tool or stainless steel, is secured to the lower or base side of each of the blade supports 53 as by screws 57. In the event that any of the snipping blades or their supports should become dull or damaged, they can be removed and replaced by first removing the domed cover plate 39, and then removing the screws 52 which secure the ears 51 to the carrier.

A sloping tip discharge channel 56 is formed in the upper side of the gear case B below the perforated area of the shear plate 40 to receive the bean tips which are snipped from the beans and direct them into a gravity discharge chute 69.

At their lowermost point of rotative travel the pockets 46 of the upper carrier D1 are horizontal, as will be noted in Fig. 1, and at this point in the rotation of the upper carrier D1, the pockets pass across the previously described opening 10 communicating between the recesses formed by the lower and upper conical portions C1 and C2 of the conical wall C.

The lower carrier D2 has a running fit within the lower conical portion C1, in the same manner as that described herein for the upper carrier D1 and the upper conical portion C2. Said lower carrier D2 is provided with a plurality of wedge shaped pocket forming partitions 58 of the same size, shape, number and disposition as those of the upper carrier D1 which define radially extending pockets 59 similar to the pocket portions 46 in the upper carrier D1.

The bevel gears 29 and 30 are so intermeshed that successive pockets of both carriers D1 and D2 will register with each other through the opening 10 in the double conical wall C as the carriers rotate in unison but in opposite directions as mentioned previously herein. Therefore, as each pocket 46 in the upper carrier D1 swings to its horizontal position over the opening 10, the beans contained in said pocket will drop by gravity through the opening 10 into the registering, underlying pocket 59 in the lower carrier D2.

Another shear plate 60 (Figs. 1, 2, 3, 8 and 9) for snipping the tips from the other ends of the beans than those snipped by the upper shear plate 47, is bolted to the rim 61a of a spider 61 which covers the downwardly directed diverging end of the carrier D1 and which is bolted to the transverse frame brace 15. Like the upper shear plate 47 said lower shear plate 60 is of truncated conical shape and is arranged to close the outer ends of the pockets 59 formed along the lower carrier D2 and in its lowermost sector it has a plurality of slotted perforations 63 and also a discharge gap 64 adjacent to and beyond the perforated area in the direction of rotation of the rotary carrier D2 (Fig. 3). Hence, when during rotation of the lower carrier D2 the pockets 59 and the beans therein, are in substantially upright position, the other ends of the beans will encounter and gravitate into the perforations 63.

The outer ends of the pocket-forming partitions 58 of the lower carrier D2 may have shearing engagement with the lower shear plate 60 across the perforated area thereof, or, if desired, separate shear blades of a desired type, such as the blades 55 shown in Figs. 5, 6 and 7, may be suitably supported from the rotary carrier D2 to have shearing engagement with the edges of the perforations 63 of the lower shear plate 60.

A discharge chute 65 is provided beneath the perforated area of the lower shear plate 60 to catch the tips snipped off by the operation of the device and to guide them to a desired point of deposit. A second chute, 68 (Fig. 2) is mounted beneath the bean discharge gap 64 in the lower shear plate to receive and convey to a desired destination the snipped beans which drop by gravity from pockets 59 in the lower carrier D2 as successive pockets register with the gap.

Operation

A quantity of the product to be snipped, such as green beans for example, is fed in any desired manner into the hopper F in a promiscuous mass, the rate of feed preferably being such as to maintain the hopper about one fourth to one third full during its continuous operation. The drive shaft 23 is rotated to drive the conical carriers D1 and D2 in opposite rotative directions.

The pockets 46 in the hopper F are of considerably less width than the length of the beans 67 (Figs. 5 and 6) so that only those beans in the mass which are disposed longitudinally over the portions of the pockets 46 in the hopper will drop therein as the pockets are passed beneath the mass of beans which is constantly tumbled about by the rotation of the hopper. As the hopper pockets, which (Fig. 1) are horizontal at the bottom of the hopper, swing upwardly and approach their upright position, the longitudinally arranged batch of beans in each pocket 46 slides endwise by gravity downwardly into the aligned and co-extensive lower portion of the pocket between the wedge shaped partitions 38 of the upper carrier D1.

In this upright position of the pocket, the lower ends of the beans 67 therein (Figs. 5 and 6), rest upon the upper shear plate 47, and the lower tip ends of the beans tend to gravitate into the perforations 49 therein. The shearing edges of the partitions 38, or other tip severing means such as the shear blades 55, are swept across the perforations by the rotation of the carrier and snip off the tips of the beans which are in the perforations. The snipped tips fall through the perforations 49 into the channel 56 in the gear case B, whence they pass by gravity down the tip discharge chute 69 to a desired disposal point such as a receptacle, not shown.

The pockets 46, with the beans having one end snipped therefrom, then are swung around by the rotation of upper carrier D1 until they register successively in horizontal position, with the opening 10 in the double conical wall C, whereupon the beans drop from the downwardly open pockets 46, through said opening 10 into the registering, upwardly open pockets 59 on the upper side of the lower carrier D2.

The beans then are carried around in the pockets 59 by the rotation of the lower carrier D2 until said pockets assume successively an upright position over the top shearing perforations 63 in the lower shear plate 60. In this position, the beans, being inverted from their position when over the perforations 49 in the upper shear plate 47, will have their unsnipped ends gravitate into the perforations 63 in the lower shear plate 60. The outer edges of the pocket-forming partitions 58 of the lower carrier D2, or of other suitable cutting means, then snip off the tips thus inserted in the perforations of the lower shear plate.

The snipped tips drop into the tip discharge chute 65, whereupon the pockets 59 while still in substantially upright position, swing into register with the discharge gap 64 in the lower shear plate where the beans, both ends snipped therefrom, drop from the pockets 59 into the chute 68 (Fig. 2).

In the embodiment of the invention illustrated in Figs. 11, 12 and 13 the arrangement is such that the depth to which the tips of the beans are snipped off may be adjusted. For this purpose, the floor of the annular chamber formed between the upper conical wall portions C2 and the conical wall 37 of the upper bean carrier D1 is formed by the conical embossment 18' of the gear case B' instead of the conical shear plate 47 as in the construction illustrated in Fig. 1. Over an arc corresponding to the summit area of said floor, however, the conical embossment 18' is recessed as indicated at 80 and in this area the floor of said annular chamber is formed by an arcuate strip 81 which commences flush with, and constitutes a continuation of, the conical side wall of said embossment but forms a depression 81a below the highest point of said annular chamber. A limited distance above the depressed portion 81a of said strip 81, there is provided a cutting blade 82 that is secured to an outwardly directed annular flange 83 formed along the outer conical wall portion C2 above a suitable opening 84 provided in said wall portion. The depressed portion 81a of said arcuate floor strip 81 is yieldable and rests upon a plate 85 mounted upon the upper end of a threaded stem 86 that is received in an apertured lug 87 (Fig. 12) which is bolted to and projects from the recessed portion 80 of the conical embossment 18'. Threaded nuts 88a and 88b engage the threaded stem 86 above and below the lug 87 and when tightened maintain said stem in any desired vertical position of adjustment. By varying the vertical position of the threaded stem 86 the level of the portion of the arcuate floor strip 81 defining the depression 81a may be varied at will, and since during operation of the machine the vertically positioned aligned beans slide along said floor strip with their lower tips resting thereon, adjustment of the vertical position of the depressed area of said floor strip will vary the depth to which the tips are cut from the beans when they are carried against the blade 82 by rotation of carrier D1.

The lower bean snipping unit may similarly be constructed to permit selective variation in the depth to which the tips are cut from the other ends of the beans. For this purpose, the conical plate 90 that forms the floor of the annular chamber defined by the lower conical wall portion C1 and the conical wall 17' of the lower bean carrier D2 may form a yieldably depressed area 90a at its lowest point where it supports the beans in upright position with their unsnipped ends pointing downwardly. Disposed a limited distance above said depressed area is a cutting blade 91 that may suitably be supported from the outer conical wall C1 adjacent a window 92 provided in said conical wall (Fig. 13). The depressed area 91a of the floor plate 90 rests on a plate 93 mounted upon a threaded stem 94 that extends through a threaded sleeve 95 which is held in a portion of the pedestal of the machine. By turning said sleeve the vertical position of the threaded stem 94 with its plate 93, and hence the depth of the tips cut from the other ends of the beans may selectively be varied. A nut 96 may be provided on the downwardly projecting end of the threaded stem 94 to enable fixing of said stem in any of its positions of vertical adjustment.

While I have described a preferred embodiment of the present invention, it will be understood however that various changes and modifications may be made in the details thereof without departing from the spirit of the appended claims. Furthermore, while I have used the term "beans" as illustrative of a product being processed, it will be obvious to those familiar with the art that a machine embodying the invention is capable of snipping the tips from other elongated objects and vegetable products, such as, for example, carrots. The term "bean" therefore, as used herein, is intended to include such other objects and products that are capable of being processed by use of the present invention.

Having thus described the invention, what I claim as new and desire to protect by Letters Patent is as follows:

1. A bean snipping mechanism comprising a pair of superposed truncated conical carriers mounted substantially tangent to each other along a horizontal line, said carriers having pockets along the sides thereof adapted to register successively at the line of tangency on rotation of said carriers, means operably connected to said carriers for rotating the same in unison alternately to tilt the pockets thereof between upright and reclining positions, a retaining wall closely surrounding the carriers to enclose the pockets, said wall having a bean transferring gap therein adjacent the line of tangency of the carriers, snipping means mounted beneath the lower ends of the pockets in each of said carriers at the rotative stage thereof where the pockets are in their upright positions, and discharge means located beyond the snipping means for the lower carrier in the direction of lower carrier rotation for discharging the beans from the pockets of the lower carrier.

2. A bean snipping mechanism comprising a pair of continuously rotating truncated conical carriers mounted one above the other for rotation about axes at right angles to each other, the conical surfaces of said carriers being substantially tangent to each other along a horizontal line common to both, each of said carriers having pockets arranged peripherally thereof and adapted to register successively with those of the other on rotation of said carriers, means operably connected to said carriers for continuously rotating them in unison, and snipping means mounted across pockets of said carriers.

3. Bean handling mechanism comprising a pair of continuously rotating truncated conical carriers mounted one above the other for rotation about axes at right angles to each other, the conical surfaces of said carriers being substantially tangent to each other, each of said carriers having pockets peripherally thereof adapted to register successively with those of the other on rotation of said carriers, a retaining wall closely surrounding the carriers to enclose the pockets thereof, means for introducing successive batches of beans into the pockets of one of said carriers, means operably connected to said carriers for rotating them in unison, said retaining wall being formed with an aperture adjacent the line of tangency of the carriers to permit the beans in the pockets of the upper carrier to drop laterally into registering pockets of the lower carrier, and discharge means mounted to discharge the beans from the pockets of the other carrier.

4. A bean snipping mechanism comprising a frame, a pair of perpendicularly disposed shafts mounted on the frame and disposed with their axes divergent and intersecting, a pair of walled enclosures of conical shape disposed co-axially of said shafts and one above the other in substantially tangential to relation each other, said enclosures being in open communication with each other adjacent their zone of tangency, snipping means mounted adjacent each walled enclosure, and continuously operating means operatively associated with each enclosure for carrying means around the walls thereof to move the beans past the snipping means to snip the tip from an end of each bean.

5. A bean snipping mechanism comprising a pair of superposed walled enclosures of conical shape disposed substantially tangent to each other, snipping means mounted in each of said walled enclosures, and means mounted within each of said enclosures for continuously carrying beans around the walls thereof and past the snipping means therein to snip the tip from an end of each bean, said walled enclosures having a common aperture at their point of tangency to permit the beans to drop from one of said enclosures to the other.

6. In a bean snipping machine a hollow base, a pair of shafts journaled in said base and extending divergently therefrom at substantially equal angles above and below the horizontal, respectively, drive means mounted to rotate said shafts in opposite directions, a carrier of truncated conical shape mounted on each of said shafts to rotate therewith, said carriers being tangential along a line bisecting the angle defined by the axes of the two shafts, a plurality of radially extending partitions on each carrier defining outwardly opening pockets, said pockets being tilted by rotation of their respective carriers between upright and reclining positions, retaining means surrounding said carriers, means for introducing batches of beans in upright position into successive pockets of the upper one of said carriers, means for snipping the tips from the lower ends of the beans when upright in said last mentioned pockets, said retaining means forming a gap adjacent the line of tangency of said carriers for the beans to pass by gravity in a substantially horizontal position from the pockets of said upper carrier into registering pockets of the lower carrier to be swung to upright inverted position on rotation of said lower carrier, and means for snipping the tips from the lower ends of the beans when upright and inverted in the pockets of said lower carrier.

7. In a bean snipping machine a pair of rotary bean holders mounted on axes oppositely inclined from the horizontal, the sides of said bean holders being divergent from their axes with one side of each substantially upright and the opposite side substantially horizontal, a plurality of pockets formed lengthwise of the sides of both of said holders, means operably mounted adjacent the upper one of said holders for introducing beans endwise into the upright pockets thereof, means mounted adjacent said upper holder for snipping the tips from the lower ends of said beans in said upright position, a retaining wall enclosing each of said bean holders except for a gap adjacent the common horizontal side of said holders to permit the beans to drop from the horizontal pockets of the upper one of said holders into the horizontal pockets of the lower one of said holders, and means mounted adjacent the lower holder for snipping the tips from the other ends of the beans in the upright pockets of said lower holder.

8. A bean snipping mechanism comprising a pair of superposed, truncated, conical carriers rotatably mounted in tangential relation with each other along a horizontal line common to each, each of said carriers having a plurality of bean receiving pockets along the sides thereof, means mounted adjacent the upper one of the carriers for inserting a batch of aligned beans in successive pockets thereof, means operably connected to said carriers for rotating the same in opposite directions to cause said batches of beans to pass from the upper carrier into successive pockets in the lower one of said carriers at their line of tangency, and means in cooperative association with each of the carriers for snipping the tips from one end of said batches of beans in the pockets of the carriers.

9. A bean snipping mechanism comprising a pair of superposed substantially tangentially mounted, truncated, conical carriers, each of said carriers having a plurality of outwardly opening bean receiving pockets along the sides thereof, a confining wall closely surrounding said carriers and having a bean transferring gap therein along the line of tangency of said carriers, a bean arranging hopper supported on the upper one of said carriers to rotate co-axially therewith, said hopper having a plurality of inwardly opening pockets therein aligned with the pockets of the upper carrier, means for rotating the carriers in opposite directions to successively align the pockets of said carriers through said gap and thus transfer the batches in the pockets of the upper carrier into aligned pockets in the lower carrier, the pockets of both carriers being swung successively between horizontal and upright positions by the rotation of the carriers, and means for snipping the tips from one end of each of said batches of beans in their upright position in the pockets of each of said carriers.

10. A bean snipping mechanism comprising a pair of superposed, adjacent, truncated conical carriers mounted with adjacent sides thereof substantially tangent along a horizontal line, said carriers having pockets along the sides thereof, means for rotating said carriers in unison to tilt the pockets thereof between upright and reclining positions, and to bring the pockets of the upper one of said carriers successively into register with pockets of the lower one of said carriers, means for introducing beans endwise into the pockets of the upper carrier, a retaining wall closely surrounding the pockets, said wall having a bean transferring gap therein along the line of tangency of the carriers, snipping means in both of said carriers mounted beneath the lower end of the pockets where the pockets are in their upright positions, and means for discharging the beans from the pockets of the lower carrier.

11. A bean snipping mechanism comprising a base having a pair of truncated conical embossments thereon disposed with their axes intersecting to define a plane, a pair of peripherally pocketed conical carriers rotatably mounted one co-axially of each of said embossments with the pocketed peripheries of said conical carriers substantially tangent to each other, means operably connected to the carriers for simultaneously rotating them in opposite directions to bring successive pockets thereof into register at the line of tangency, means closely enclosing the pocketed peripheries of said carriers, said enclosing means having a gap therein adjacent the line of tangency of said carriers to establish communication between successive registering pockets of the two carriers, means mounted adjacent one of the carriers for introducing beans into the pockets thereof, tip severing means mounted to snip the tips from one end of the beans in the pockets of said one carrier, and separate tip severing means mounted to snip the tips from the other end of the beans in the pockets of the other one of said carriers.

References Cited in the file of this patent
UNITED STATES PATENTS

| Number | Name | Date |
|---|---|---|
| 1,113,307 | Carnochan | Oct. 13, 1914 |
| 1,256,492 | Urschel | Feb. 12, 1918 |
| 1,400,290 | Johannes | Dec. 13, 1921 |
| 1,503,612 | Taylor | Aug. 5, 1924 |
| 1,726,032 | Laughlin | Aug. 27, 1929 |
| 1,882,481 | Buck | Oct. 11, 1932 |
| 1,897,664 | Hansen | Feb. 14, 1933 |
| 1,993,197 | Urschel | Mar. 5, 1935 |
| 2,467,278 | Thompson | Apr. 12, 1949 |